(12) United States Patent
Choi

(10) Patent No.: US 9,315,423 B2
(45) Date of Patent: Apr. 19, 2016

(54) CRYSTALLIZED SILICATE POWDER BY SYNTHESIZED AND HIGH TEMPERATURE REISTANT PORCELAIN BODY HAVING THE SAME

(71) Applicant: Korea Institute of Ceram Choice LTD, Daejeon (KR)

(72) Inventor: Eui Seok Choi, Seoul (KR)

(73) Assignee: Korea Institute of Ceram Choice LTD, Daejeon (KR)

(*) Notice: Subject to any disclaimer, the term of this patent is extended or adjusted under 35 U.S.C. 154(b) by 2 days.

(21) Appl. No.: 14/277,052

(22) Filed: May 14, 2014

(65) Prior Publication Data

US 2015/0329427 A1    Nov. 19, 2015

(51) Int. Cl.
- *C04B 35/03* (2006.01)
- *C04B 35/14* (2006.01)
- *C04B 33/00* (2006.01)

(52) U.S. Cl.
CPC ............. *C04B 35/14* (2013.01); *C04B 33/00* (2013.01)

(58) Field of Classification Search
CPC ............. C04B 35/19; C04B 35/195; C04B 2235/3206
USPC ............................. 501/118, 119, 120
See application file for complete search history.

(56) References Cited

U.S. PATENT DOCUMENTS

| | | | | |
|---|---|---|---|---|
| 4,295,892 A * | 10/1981 | Matsuhisa et al. | ............ | 501/120 |
| 4,810,681 A * | 3/1989 | Hayakawa | ............ | 501/119 |
| 5,079,064 A * | 1/1992 | Forsythe | ............ | 428/131 |
| 5,902,363 A * | 5/1999 | Connolly et al. | ............ | 55/487 |
| 5,989,420 A * | 11/1999 | Sugimoto | ............ | 210/222 |
| 2005/0215417 A1* | 9/2005 | Teratani et al. | ............ | 501/119 |
| 2007/0228622 A1* | 10/2007 | Fujioka et al. | ............ | 264/650 |
| 2007/0232740 A1* | 10/2007 | Fujioka et al. | ............ | 524/444 |

* cited by examiner

Primary Examiner — Noah Wiese

(57) ABSTRACT

The present invention discloses crystallized silicate-synthetic powder comprising a cordierite ($2MgO.2Al_2O_3.5SiO_2$) crystalline phase, a mullite ($3Al_2O_3.2SiO_2$) crystalline phase and a corundum ($Al_2O_3$) crystalline phase, and discloses a high-heat resistant porcelain body containing the above crystallized silicate-synthetic powder and formed by mixing the crystallized silicate-synthetic powder and kaolin mineral.

7 Claims, 6 Drawing Sheets

CRYSTALLIZED SILICATE POWDER BY SYNTHESIZED AND HIGH TEMPERATURE REISTANT PORCELAIN BODY HAVING THE SAME

BACKGROUND OF THE INVENTION

1. Field of the Invention

The present invention relates to a crystallized silicate-synthetic powder and a high-heat resistant porcelain body including the same.

2. Description of the Related Art

A silicate-heat resistant porcelain body is made with natural clay material such as clay and kaolin and made through traditional fabricating processes such as a mixing process, a finely-pulverizing process, a forming process and a sintering process. The silicate-heat resistant porcelain body requires the low thermal expansion property to be prevented from be damaged in use.

In current, the silicate-heat resistant porcelain body which has been produced in Korea has the flexural strength of approximately 90 to 100 MPs and is to be required flawlessness and non-crack during the rapid heating test (KSL1003: ASTMC1525:04(2013): rapid heating in an electric oven and rapid cooling in water, at the temperature of 280-290° C. for the high-heat resistant porcelain to which flame is directly applied).

In current, the many researches for developing and mixing new sintering agents have been carried out for enhancing the material properties and characteristics of the silicate-heat resistant porcelain body. However, the conventional heat resistant porcelain body is made with multi-element natural mineral and made through the sintering and melting processes which are simultaneously carried out. Therefore, it is difficult to enhance the high heat-resistance and the impact strength of the silicate-heat resistant porcelain body.

SUMMARY OF THE INVENTION

An object of the present invention is to provide a crystallized silicate-synthetic powder which can increase a heat resistance of porcelain body and to provide a high-heat resistant porcelain body including the same.

The crystallized silicate-synthetic powder of the present invention includes a cordierite ($2MgO.2Al_2O_3.5SiO_2$) crystalline phase, a mullite ($3Al_2O_3.2SiO_2$) crystalline phase and a corundum ($Al_2O_3$) crystalline phase. In the crystallized silicate-synthetic powder, at this time, a fraction of the cordierite crystalline phase may be 50 to 70%, a fraction of the mullite crystalline phase may be 10 to 30% and a faction of the corundum crystalline phase is 10 to 30% in a fraction of crystalline phase. In addition, the crystallized silicate-synthetic powder may be formed by mixing kaolin ($Al_2O_3.2SiO_2$), talc ($Mg_3Si_4O_{10}(OH)_2$), magnesite ($MgCO_3$) and alumina ($Al_2O_3$). Furthermore, the crystallized silicate-synthetic powder may further include petalite.

The high-heat resistant porcelain body of the present invention is formed by mixing the crystallized silicate-synthetic powder illustrated as above and kaolin mineral. At this time, the high-heat resistant porcelain body may be formed by mixing the crystallized silicate-synthetic powder of 20 to 40 weight % and the kaolin mineral of 60 to 80 weight % with respect to the total weight. The high-heat resistant porcelain body may further include petalite of 0 to 10 weight part with respect to the total 100 weight parts of the crystallized silicate-synthetic powder and the kaolin mineral. In addition, the high-heat resistant porcelain body may further comprise a spinel crystalline phase which is the second crystalline phase.

The crystallized silicate-synthetic powder and the high-heat resistant porcelain body containing the same of the present invention is advantageous in that the heat resistance of the porcelain body is increased since the crystalline phase which is uniformly distributed in the porcelain body is formed in the sintering process performed after mixing crystallized silicate-synthetic powder having the crystalline phase with kaolin mineral.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same and similar reference numbers.

DETAILED DESCRIPTION

Figure 1:
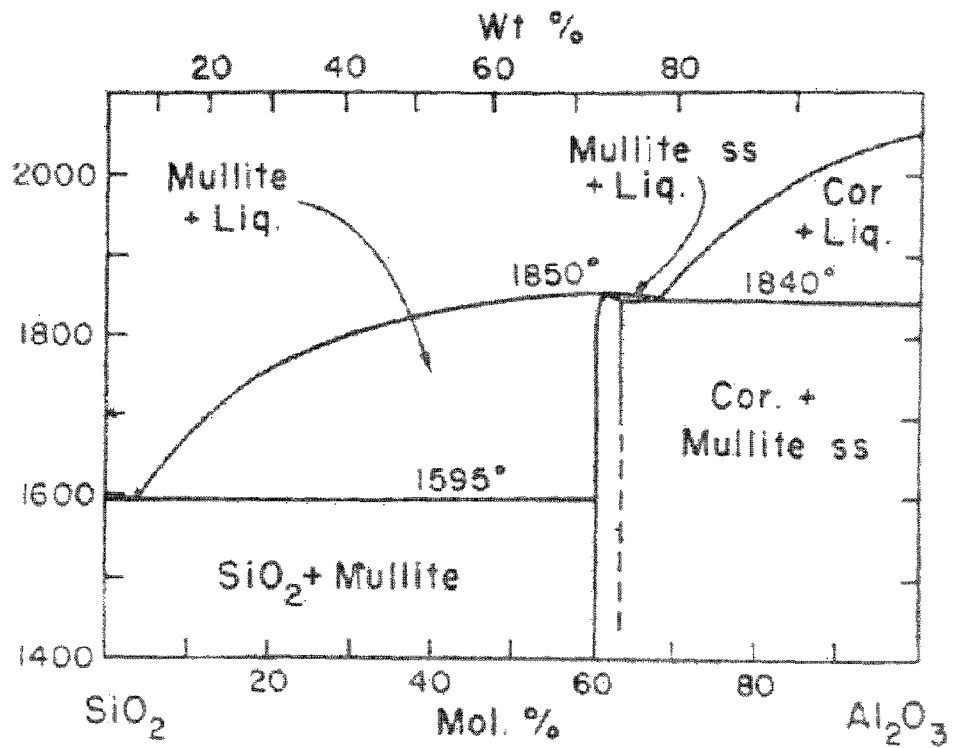
FIG. 1 is a phase diagram of $Al_2O_3$—$SiO_2$ System.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a crystallized silicate-synthetic powder and a high-heat resistant porcelain body including the same according to exemplary embodiments of the present invention will be described in detail with reference to the accompanying drawings.

First of all, the crystallized silicate-synthetic powder according to one embodiment of the present invention will be described below.

The crystallized silicate-synthetic powder according to one embodiment of the present invention contains cordierite ($2MgO.2Al_2O_3.5SiO_2$) crystalline phase, mullite ($3Al_2O_3.2SiO_2$) crystalline phase and corundum ($Al_2O_3$) crystalline phase. In the crystallized silicate-synthetic powder, preferably, a fraction of the cordierite crystalline phase is 50 to 70%, a fraction of the mullite crystalline phase is 10 to 30% and a faction of the corundum crystalline phase is 10 to 30%. The crystallized silicate-synthetic powder is formed into Congruent Composition Crystallized Powder and utilized as sintering agent. In a sintering process of the porcelain body, in other words, the crystallized silicate-synthetic powder maintains a crystalline phase of itself in a glassy matrix constituting the porcelain body, and reinforces a frame structure of the porcelain body to enhance a heat-resistance property of the porcelain body. In addition, the crystallized silicate-synthetic powder can form the crystalline phase in the glassy matrix constituting the porcelain body to increase the strength of the porcelain body. In the crystallized silicate-synthetic powder, therefore, the cordierite crystalline phase constitutes the main crystalline phase, and a heat resistance property of the porcelain body is enhanced due to the low thermal expansion property of the cordierite crystalline phase.

In addition, the crystallized silicate-synthetic powder which acts as a crystallizing agent in a sintering process of the porcelain body generates the second crystalline phase or the third crystalline phase and is created. Furthermore, unlike feldspar, when utilized as the sintering agent, since the crystallized silicate-synthetic powder has a short melting point zone and a short sintering zone, it is possible to obtain uniform contraction and homogenized sintering. In addition, the crystallized silicate-synthetic powder is formed from kaolin mineral and forms additionally the crystalline phase in the glassy matrix constituting the porcelain body so that crystallized silicate-synthetic powder increases the structural stability of the porcelain body and reduces the thermal shrinkage. Meanwhile, since feldspar utilized before as the sintering agent is melted in advance in the firing process, this feldspar may cause a deformation of the porcelain body according to a particle wetting and a viscous to cause a relatively uneven contraction of the porcelain body.

Figure 2:
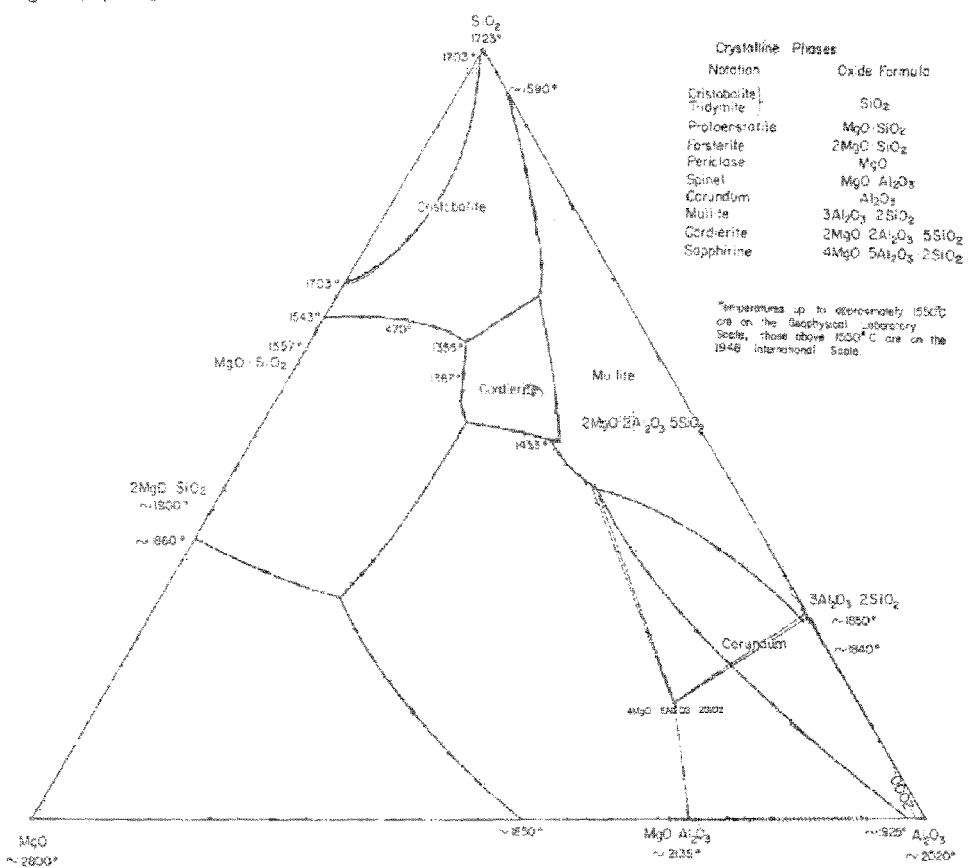
FIG. 2 is a phase diagram of $Al_2O_3$—$SiO_2$—$MgO$ System.
Figure 3:
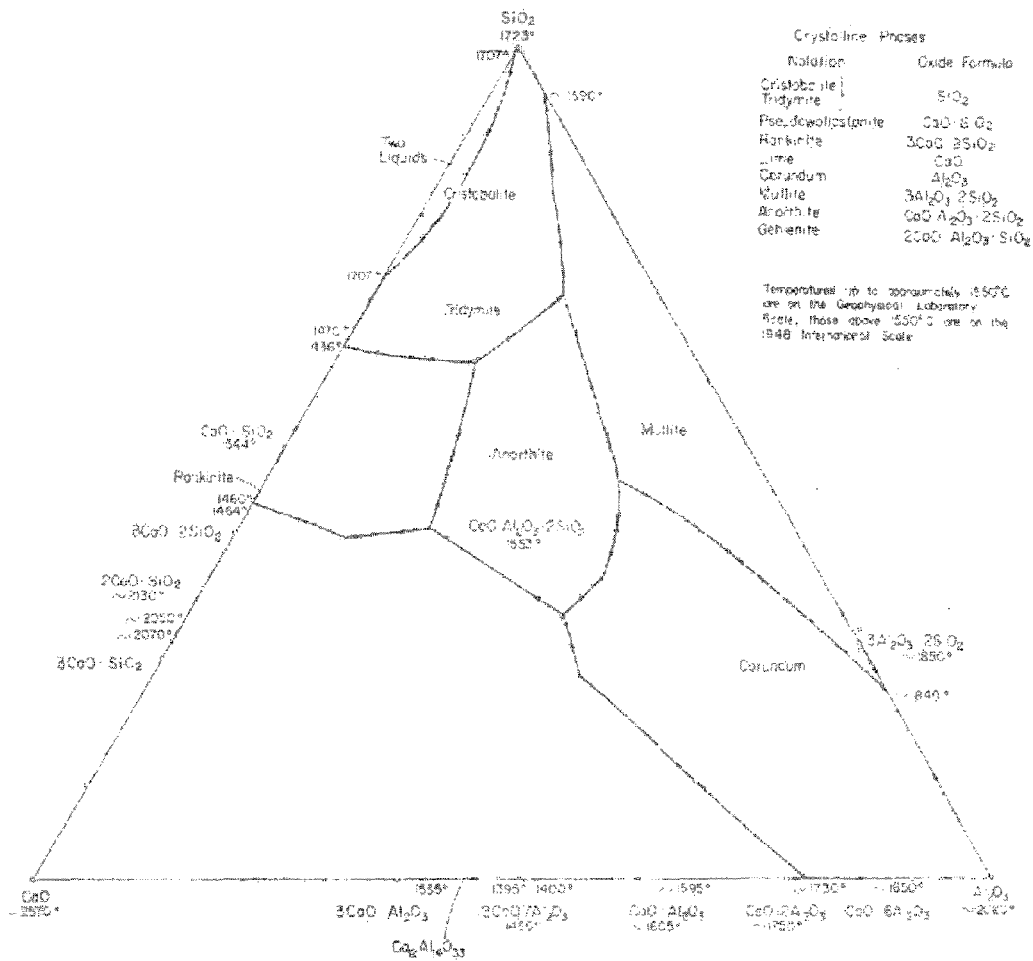
FIG. 3 is a phase diagram of $CaO$—$Al_2O_3$—$SiO_2$—$MgO$ system.

The crystallized silicate-synthetic powder is synthesized in the firing process for the powder of raw materials in which kaolin ($Al_2O_3.2SiO_2$), talc ($Mg_3Si_4O_{10}(OH)_2$), magnesite ($MgCO_3$) and alumina ($Al_2O_3$) are mixed. In addition, the crystallized silicate-synthetic powder may further contain petalite. On the other hand, petalite may be mixed in the process of mixing raw material for the high-heat resistant porcelain body. Instead of alumina, in addition, aluminum hydroxide ($Al(OH)_3$) may be utilized to form the crystallized silicate-synthetic powder. With respect to total 100 weight % of the crystallized silicate-synthetic powder, kaolin of 40 to 50 weight %, talc of 10 to 30 weight %, magnesite of 10 to 20 weight % and alumina of 10 to 25 weight % are mixed to form the crystallized silicate-synthetic powder. In addition, the crystallized silicate-synthetic powder may contain petalite of 0 to 10 weight %. Petalite is a low-expansion raw material and can further reduce the thermal expansion of the high-heat resistant porcelain body. At this time, a content of raw material powder to be mixed for the crystallized silicate-synthetic powder was determined by employing the phase diagrams of FIG. 1 and FIG. 2. A composition ratio of $Al_2O_3$—$SiO_2$—MgO was determined by the compositions of formation zones of the cordierite, the mullite and the corundum in FIG. 2. The firing process is carried out at the firing temperature of 1,200~1,400° C. for 4 to 6 hours to form the crystallized silicate-synthetic powder. At this time, as the firing atmosphere is maintained in an atmosphere or an oxidation atmosphere. After completing the firing process, an additional pulverizing process may be performed for the crystallized silicate-synthetic powder.

Next, the high-heat resistant porcelain body including the crystallized silicate-synthetic powder according to the embodiment of the present invention is illustrated.

The high-heat resistant porcelain body according to the embodiment of the present invention is formed by sintering a porcelain body powder obtained by mixing kaoline mineral and the crystallized silicate-synthetic powder. In addition, the high-heat resistant porcelain body may further include petalite. Meanwhile, petalite may be added and mixed in the process for manufacturing the crystallized silicate-synthetic powder.

A component analysis for kaolin mineral and the crystallized silicate-synthetic powder is shown in Table 1.

Beside kaolin, kaolin mineral means silicate-based mineral such as clay or agalmatolite. Preferably, kaolin may be utilized as kaolin mineral. In addition, kaolin mineral may contain kaolin and agalmatolite. Also, kaolin mineral utilized for producing a conventional porcelain body may be utilized as the above-mentioned kaolin.

| Raw material | $SiO_2$ | $Al_2O_3$ | $Fe_2O_3$ | CaO | MgO | $K_2O$ | $Na_2O$ | $TiO_2$ | $P_2O_5$ | LOI | Total |
|---|---|---|---|---|---|---|---|---|---|---|---|
| crystallized silicate-synthetic powder | 47.54 | 30.58 | 1.88 | 0.295 | 13.3 | 1.33 | 0.33 | 0.01 | — | 0.12 | 100 |
| Kaolin | 47.41 | 35.5. | 0.80 | 0.21 | 0.15 | 0.38 | 0.02 | 0.43 | 0.17 | 14.93 | 100 |

Silica and alumina are main component of kaolin, these silica and alumina form hyaline in the high-heat resistant porcelain body and simultaneously act as a frame of the high-heat resistant porcelain body. Kaolin is pulverized into particles having a size of several microns and then mixed. Since the crystalline phase of the crystallized silicate-synthetic powder is maintained in the glassy matrix, this crystallized silicate-synthetic powder increases the strength of the porcelain body and reduces the thermal shrinkage and the thermal expansion.

The high-heat resistant porcelain body contains Kaolin of 60 to 80 wt % with respect to total weight thereof.

The high-heat resistant porcelain body contains the crystallized silicate-synthetic powder of 20 to 40 wt % with respect to total weight thereof. If a content of the crystallized silicate-synthetic powder is too low, a content of the crystalline phase in the high-heat resistant porcelain body is low so that the thermal shrinkage or the thermal expansion of the high-heat resistant porcelain body is increased. On the contrary, if a content of the crystallized silicate-synthetic powder is too high, the flexural strength of the high-heat resistant porcelain body is reduced.

The high-heat resistant porcelain body may contain petalite of 0 to 10 weight part with respect to total 100 weight parts of the crystallized silicate-synthetic powder and kaolin mineral.

The crystallized silicate-synthetic powder and kaolin mineral are weighted within the above composition range, mixed and fired. After the firing process, mixture of crystallized silicate-synthetic powder and kaolin mineral is finely pulverized and sieved with a sieve with 325 mesh to produce a porcelain body powder. The porcelain body powder is sintered in the temperature of 1,230 to 1,300° C. for three hours or more to form the high-heat resistant porcelain body. The sintering process for the porcelain body powder is performed in the oxidizing atmosphere. The high-heat resistant porcelain body is formed through a liquid phase sintering process of the porcelain body powder, and the crystalline phase caused by the crystallized silicate-synthetic powder is uniformly distributed in the glassy matrix. To be more concrete, the crystallized silicate-synthetic powder is uniformly distributed between kaolin mineral. In the liquid phase sintering process, in addition, the crystallized silicate-synthetic powder is not decomposed and is reacted with kaolin mineral through an interfacial reaction. As a result, the crystallized silicate-synthetic powder exists in the form of the crystalline phase and is sintered to from the densed high-heat resistant porcelain body. Furthermore, a second crystalline phase generated in the liquid phase sintering process for producing the high-heat resistant porcelain body exists in the glassy matrix. The second crystalline phase may be formed in the form of a spinel crystalline phase.

In the liquid phase sintering process for producing the high-heat resistant porcelain body, cordierite ($2MgO.2Al_2O_3.5SiO_2$), which is the main crystalline phase, is distributed in the glassy matrix. Therefore, since the crystalline phase obtained by the crystallized silicate-synthetic powder and the second crystalline phase formed in the liquid phase sintering process are uniformly distributed in the glassy matrix of the high-heat resistant porcelain body, the strength of the high-heat resistant porcelain body is increased. The high-heat resistant porcelain body has the coefficient of thermal expansion of approximately $2.7\times10^{-6}$. In addition, since cordierite crystalline phase having the relatively low thermal expansion is distributed in the glassy matri, the thermal expansion of the high-heat resistant porcelain body is reduced. The high-heat resistant porcelain body has the thermal shrinkage of 10 to 11%. The above high-heat resistant porcelain body may be utilized for heat resistant porcelain body for dishware and insulator for a fixed resistor or an electric transformer.

Below, the crystallized silicate-synthetic powder and the high-heat resistant porcelain body containing the same is described with reference to the specific embodiment.

First of all, in order to produce the crystallized silicate-synthetic powder, with respect to total 100 wt %, kaolin of 45 wt %, talc of 20 wt %, magnesite of 15 wt % and alumina of 20 wt % were weighted and then mixed. The mixed powder was fired at the firing temperature of 1,250° C. for one hour and an oxidation atmosphere was maintained as the firing atmosphere. After completing the firing process, the powder was pulverized and sieved with a sieve having 80 mesh to obtain the crystallized silicate-synthetic powder.

Subsequently, the crystallized silicate-synthetic powder of 30 wt % and kaolin of 70 wt % were weighted and then mixed. And, petalite of 5 weight part with respect to total 100 weight part of the crystallized silicate-synthetic powder and kaolin is mixed. The mixed power was finely pulverized in a wet method and sieved with a sieve having 325 mesh to produce the porcelain body powder. The porcelain body powder was mixed with water and then molded through a mold into a green body having a rectangular bar shape. The green body was sintered at the sintering temperature of 1,250° C. for one hour in an oxidizing atmosphere to produce the high-heat resistant porcelain body.

Figure 4:
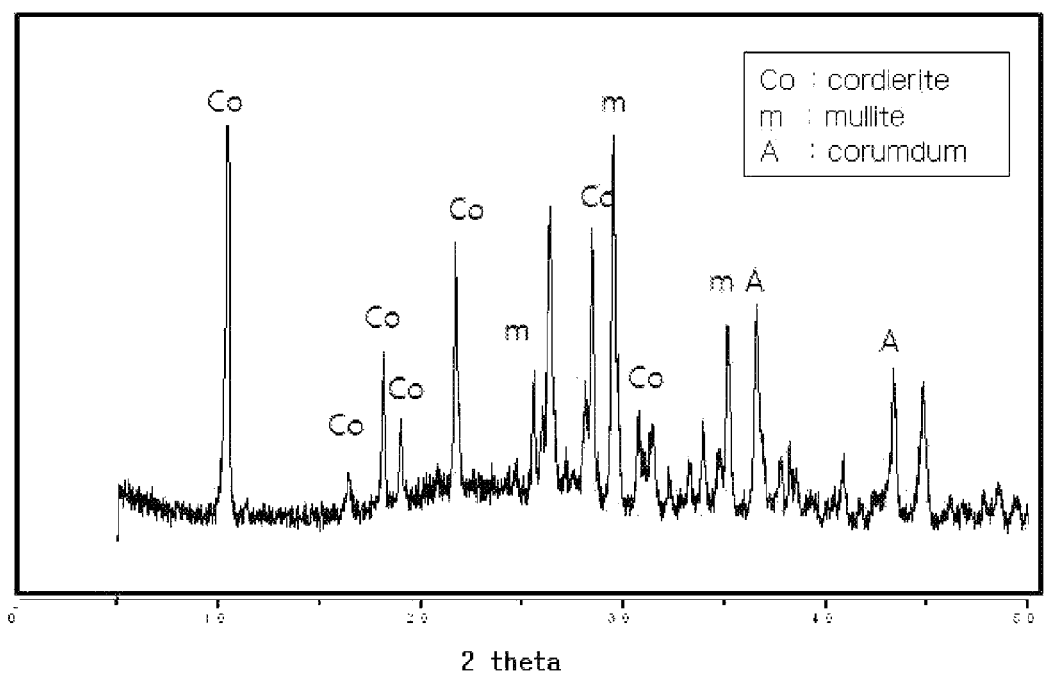
FIG. 4 is a XRD analysis graph of a crystallized silicate-synthetic powder according to one embodiment of the present invention.
Figure 6:
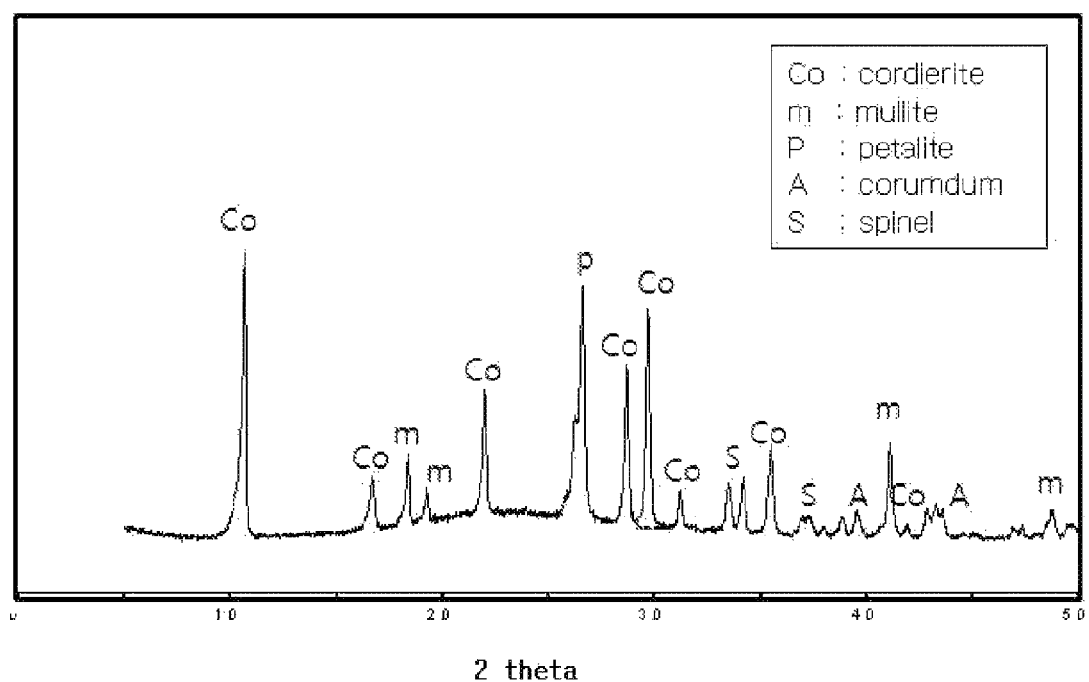
FIG. 6 is a XRD analysis graph of a high-heat resistant porcelain body according to one embodiment of the present invention.

The diffractometry was performed using X-ray diffracter (XRD) for the crystallized silicate-synthetic powder. As shown in FIG. 4, the cordierite crystalline phase, the mullite crystalline phase and the corundum crystalline phase were found in the crystallized silicate-synthetic powder. In addition, the diffractometry was performed using X-ray diffracter (XRD) for the high-heat resistant porcelain body. As shown in FIG. 6, the cordierite crystalline phase, the mullite crystalline phase and the corundum crystalline phase were found in the high-heat resistant porcelain body. In particular, the spinel crystalline phase, which is the second crystalline phase, and the petalite crystalline phase, which was additionally added, were found in the high-heat resistant porcelain body.

Figure 5:
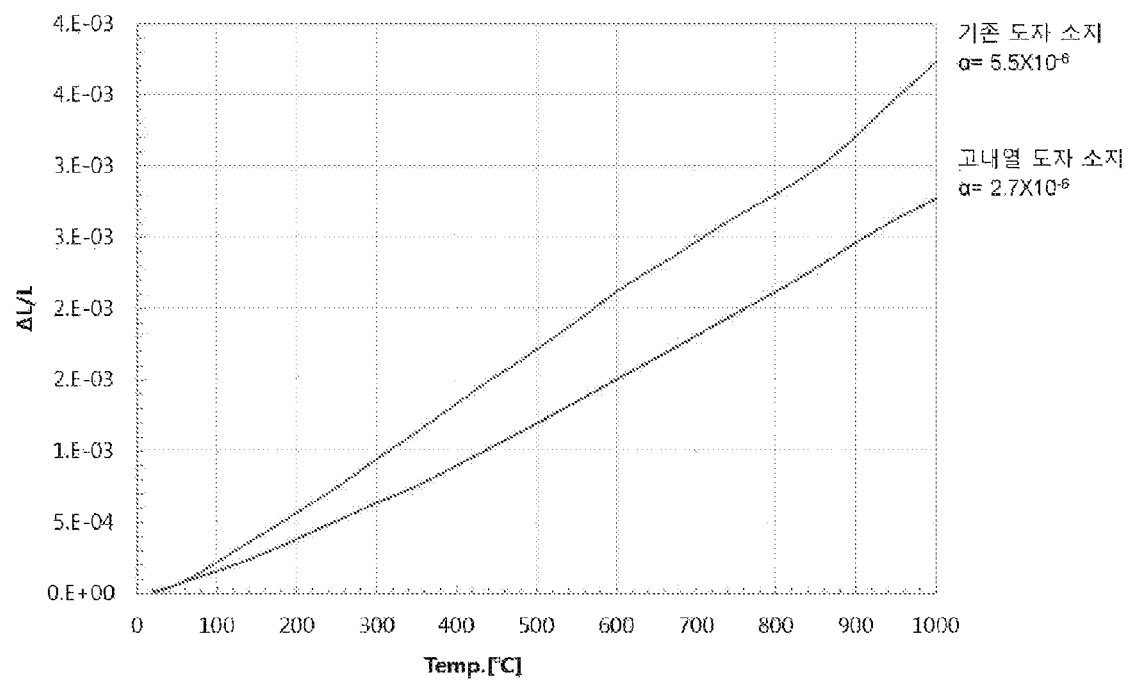
FIG. 5 is graph showing a measurement result of a coefficient of thermal expansion of a high-heat resistant porcelain body according to one embodiment of the present invention.

Firstly, the coefficient of thermal expansion of the high-heat resistant porcelain body was measured. From FIG. 5, it is possible to know that, as compared with that of the conventional porcelain body, the high-heat resistant porcelain body was reduced to half. Here, the conventional porcelain body was formed of only kaolin mineral. Meanwhile, it was possible to observe that when the petalite of 5 wt % was added, the thermal expansion of the high-heat resistant porcelain body was further reduced. In addition, the measured thermal shrinkage of the high-heat resistant porcelain body was 11.10% which is lower than the thermal shrinkage (12% or more) of the conventional porcelain body. Here, the thermal shrinkage was the average value of the measured value of five (5) high-heat resistant porcelain bodies. In the high-heat resistant porcelain body, the cordierite crystalline phase of the crystallized power is existed in the glassy matrix, and the heat resistance property is enhanced due to a low thermal expansion characteristic.

Next, the flexural strength of the high-heat resistant porcelain body was measured. The flexural strengths of the five (5) high-heat resistant porcelain bodies were measured, respectively, and an average value of five (5) measured flexural strengths was regarded as the flexural strength. The high-heat resistant porcelain body had the flexural strength of 150 MPa. Therefore, the above result shows that the high-heat resistant porcelain body of the present invention has the flexural strength greater than 90 to 100 MPa which is the flexural strength of the conventional porcelain body.

It is judged that the cordierite crystalline phase, the mullite crystalline phase and the corundum crystalline phase of the crystallized silicate-synthetic powder are distributed in the glassy matrix so that the heat resistance and impact strength of the high-heat resistant porcelain body are increased. Since the crystallized silicate-synthetic powder is the congruent composition crystallized silicate-synthetic powder, the crystallized silicate-synthetic powder is not decomposed in the sintering process, but maintains its crystalline phase. In addition, the high-heat resistant porcelain body generates the spinel crystalline phase as the second crystalline phase generated in the sintering process. In addition, it is judged that, in the high-heat resistant porcelain body, while the crystallized silicate-synthetic powder is aintered together with the silica component, the solid phase sintering and the liquid phase sintering are carried out at the liquidous temperature and the amount of hyaline is reduced, and the thermal expansion is lowered to the value of $2.7\times10^{-6}$ which is half of or less than of half of that of the conventional porcelain body due to the cordierite crystalline phase.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. Crystallized silicate-synthetic powder, comprising a cordierite ($2MgO.2Al_2O_3.5SiO_2$) crystalline phase, a mullite ($3Al_2O_3.2SiO_2$) crystalline phase, a corundum ($Al_2O_3$) crystalline phase, and petalite.

2. The crystallized silicate-synthetic powder of claim 1, wherein a fraction of the cordierite crystalline phase in the crystallized silicate-synthetic powder is 50 to 70 wt %, a fraction of the mullite crystalline phase is 10 to 30 wt % and a faction of the corundum crystalline phase is 10 to 30 wt %.

3. The crystallized silicate-synthetic powder of claim 1, wherein the crystallized silicate-synthetic powder is formed by mixing kaolin ($Al_2O_3.2SiO_2$), talc ($Mg_3Si_4O_{10}(OH)_2$), magnesite ($MgCO_3$) and alumina ($Al_2O_3$).

4. A high-heat resistant porcelain body formed by mixing the crystallized silicate-synthetic powder of claim 1 and kaolin mineral.

5. The high-heat resistant porcelain body of claim 4, wherein the crystallized silicate-synthetic powder of 20 to 40 wt % with respect to the total weight and the kaolin mineral of 60 to 80 wt % with respect to the total weight are mixed to form the high-heat resistant porcelain body.

6. The high-heat resistant porcelain body of claim 5, further comprises petalite of 1 to 10 weight part with respect to the total 100 weight part of the crystallized silicate-synthetic powder and the kaolin mineral.

7. The high-heat resistant porcelain body of claim 4, further comprises a spinel crystalline phase which is the second crystalline phase.

* * * * *